Nov. 26, 1957 W. C. FOX 2,814,188
SETTING CLUTCH FOR REGISTERS
Filed May 5, 1955

INVENTOR.
WILLIAM C. FOX
BY
Steward and Steward
ATTORNEYS

United States Patent Office 2,814,188
Patented Nov. 26, 1957

2,814,188
SETTING CLUTCH FOR REGISTERS

William C. Fox, Plainville, Conn., assignor to The Sessions Clock Company, Forestville, Conn., a corporation of Connecticut Application May 5, 1955, Serial No. 506,226

8 Claims. (Cl. 64—30)

This invention relates to settable registers and especially to friction clutch means for permitting the setting of the register indicator at any desired value. For example, time registering devices such as watches, clocks, interval time signals, time switches and the like are examples of the types of registers concerned, and usually have a pointer which runs adjacent a dial. When, for any reason, the pointer gives an incorrect time indication, it is necessary to reposition the pointer to give the correct indication. Friction clutch means are therefore provided connecting the pointer with its driving mechanism so that it will be normally driven thereby, but can be shifted relative thereto when desired for setting purposes.

Heretofore this friction clutch for setting purposes has been a constant source of difficulty for the reason that the usual constructions fail to remain in a properly operating condition for any extended period of time. Either the friction surfaces wear sufficiently that the drive connection becomes impositive or develops play, or else the surfaces become galled with consequent deterioration or failure of the original setting action so that setting of the pointer becomes stiff or jerky if not impossible to effect. Various means have been resorted to in an effort to improve the operation of such register setting clutches including the employment of special multifinger springs and mounting means therefor for applying the requisite friction to the parts. At present these efforts have resulted primarily in increased expense both for parts themselves and for the additional assembly time required, without providing any very significant improvement in the operation after a period of use and wear.

The present invention has for an object the provision of friction clutch means for settable registers which will not only have reliable drive characteristics under normal circumstances, but which will slip smoothly and freely under setting conditions and which will retain both of these properties substantially indefinitely under normal use conditions.

Another object of the present invention is to provide a friction clutch having properties materially improved over those presently available, as indicated in the foregoing object, but in such fashion that the cost involved for both parts and assembly will be, at the same time, significantly reduced as compared with constructions current in use.

In connection with the immediately foregoing object it is a feature of the invention that the clutch consists merely in the connection between a shaft or hub and an outer rotary member or gear mounted thereon without auxiliary springs and attaching elements being required.

It is another feature of the invention, at least in certain of its aspects, that the shaft and outer member may be readily assembled by merely snapping the two together without requiring special tools or skill, and without requiring separate retaining or fastener elements.

A further feature of the invention is the construction of one or both elements of the friction clutch using a resilient, tough, wear-resistant synthetic resinous composition with scuff-resistant properties in place of the usual brass or steel parts. In connection with this feature the composition employed is also preferably one whose coefficient of starting friction in contact with itself or with other materials is unusually high as compared with its coefficient of running friction in comparable situations.

Additional objects and advantages will appear hereinafter as the description proceeds.

Figure 1:
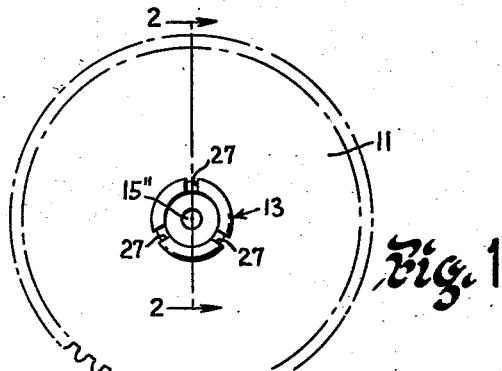
Fig. 1 is an elevation of a shaft and gear assembly illustrating a clutch according to the present invention.
Figure 2:
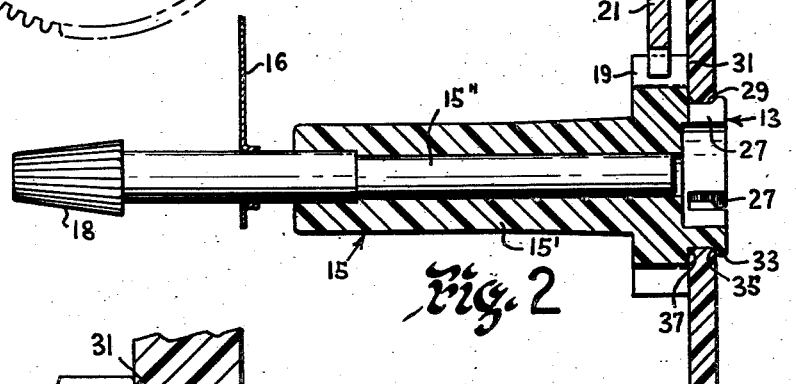
Fig. 2 is a sectional view to a larger scale showing the parts as they would appear on line 2—2 of Fig. 1, together with additional meshing gearing also in section.

Referring to the drawings which illustrate a portion of a register and particularly of a time register or clock, there is shown in Figs. 1 and 2 a gear 11 which is mounted on a hub portion 13 of an indicator shaft 15. For purposes of description the shaft 15 may be considered the minute shaft of a clock and the gear 11 the immediately driving gear therefor. As seen in Fig. 2 the gear 11 may mesh with and be driven by a suitable pinion 17 in the power train, while the shaft 15 may also include an integral pinion 19 which meshes with a suitable gear and pinion idler 21, 23, for driving another gear 25 which may be associated with the hour train.

In the form shown in Fig. 2, shaft 15 is a composite member consisting of a resinous sleeve 15' drivingly bonded to a metal pin 15''. The pin 15'' carries a minute hand 16 which may be grasped when it is desired to set the clock, or the pin 15'' may be extended to carry a setting knob 18 for this purpose. It will also be understood that setting arrangements employing remote controls geared to shaft 15, via pinion 19, for example, may also be used if desired.

In order to set the clock at any desired time reading, it is usual to provide between the gear 11 and shaft 15 a friction clutch connection which is intended normally to cause driving of the shaft 15 by the train 17, 11, but which will permit optional rotation of shaft 15 from other sources without disturbing the position of train 11, 17.

Figure 3:
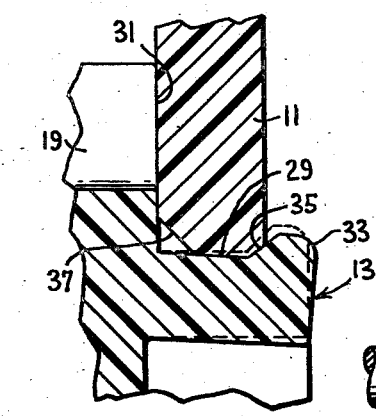
Fig. 3 is a detail section to a still larger scale illustrating the structural features and operation of the clutch portion of the mechanism of Figs. 1 and 2.

According to the present invention the required friction clutch connection is provided essentially as parts of the gear and shaft members themselves, and without the necessity for spring rings having radial leaf spring arms and their attendant mounting means as heretofore commonly employed. One element of the clutch is the hub portion or inner rotary element 13, which in the preferred form of the invention shown in Figs. 1 to 3, is provided with a plurality of axially extending slots 27. The slots 27 provide relief for the hub so that the hub segments therebetween, although relatively rigid, can undergo a resilient radial collapse to a very small extent if required. The other element of the clutch is the gear or outer rotary element 11 which has a central opening 29 providing for mounting the gear on the hub 13 and serving as a clutch surface running against the exterior of the hub 13. The dimensions of the opening 29 and hub 13 when both are in their normal relaxed condition are such that the latter is just slightly larger than the former by a few thousandths of an inch, or in any event, no smaller.

Additional frictional driving contact is obtained by compelling the gear 11 to maintain axial frictional contact with an abutment having a positioning surface locating the gear 11 axially of the shaft 15. In the showing of Figs. 1 to 3, the abutment referred to is pinion 19 which forms a positioning surface or annular shoulder 31 suited to this end, and against which the face of the gear 11 may rest to augment its frictional driving contact with the shaft 15 and to maintain its proper alignment perpendicular to the shaft.

The means for producing an axial thrust against gear 11 is embodied in a retaining flange 33 which forms part of the hub 13 and is formed thereon at the outer end to hold the gear 11 on the hub. The flange 33 is so shaped as to provide a cam surface 35 (Fig. 3) which tapers inwardly or towards the pinion 19, and which is so disposed that when the gear 11 is against the positioning surface 31, its axially outer and radially inner corner will strike on cam surface 35. The tendency to radial expansion of the hub 13 or, on the other hand, the tendency to radial contraction of the central opening 29 of gear 11 will urge the gear and cam surface 35 together and cause the gear to be cammed to the left as seen in Fig. 3 and into intimate contact with positioning surface 31.

While the structure, per se, illustrated in Figs. 1 to 3 represents an important aspect of the invention usable without regard to other features, a further, and likewise important aspect resides in the material of which certain of the parts are constructed. It has been found, for example, that in many instances a metal gear having a friction driving fit on a metal shaft will operate for a time as a friction clutch, but usually this period is rather short. Either the connection wears until the drive is loose and no longer reliable, or else one part galls the other and brings about a binding which puts an end to the smooth setting action. I have found, however, that these defects may be obviated without sacrifice of clutch simplicity if either one or both of the clutch elements are fabricated of nylon. In Figs. 2 and 3 both hub 13 and gear 11 are shown sectioned for plastic material, e. g. nylon, but it has been discovered that either may be of metal if the other is of nylon.

The properties of nylon which have a bearing on the present situation are in toughness and resilience together with wear resistance and anti-galling or anti-scuffing properties. The term "resilience" is here used to describe the property of displaying free boundary surface reshaping deformation under local compressive stress together with a sure tendency to return to original shape and dimension once the stress is withdrawn, which is a pronounced characteristic of nylon. These properties, it has been found, permit countless settings of a clutch without loosening the drive or impairing the freedom of the setting action, a feature never before achieved in a low-cost clutch of this character. While nylon has been mentioned as the material principally preferred in this use, it will be appreciated that other synthetic resinous materials having the enumerated properties will likewise fall within the scope of the invention; and where a resilient, tough, form-retentive, wear-resistant synthetic resinous composition with scuff-resistant properties is hereinafter referred to, it will be understood that nylon and its equivalents are intended to be included.

Another characteristic of nylon which lends itself admirably to the present solution of the problem of making a friction clutch for register setting is that it demonstrates a high starting friction coefficient when operating against itself or against metal, together with a remarkably low running friction in comparable circumstances. This causes the driving connection of the clutch to be quite firm and positive at all times, but makes the setting action remarkably free and smooth once the starting friction has been overcome. This property of nylon is particularly valuable and in considering for use the equivalents of nylon heretofore described, those which also demonstrate this property to the greatest extent are to be preferred.

In order to more fully take advantage of the inexpensive nature of the clutch of this invention, the parts are preferably so arranged that assembly can be effected by merely snapping the gear onto its hub without requiring special tools or separate fastener elements. The use of nylon or its equivalent as the material for at least one of the elements contributes importantly to this feature, because the flow which the material permits, allows the opening 29 to be passed over the flange 33 and then to resume its smooth friction gripping relation with the surface of the hub. While it is also possible that the slots 27 permit, during assembly, some radial deflection of the segments of the hub 13 from the normal position as shown in dotted lines in Fig. 3, it is also probably true that the deformation to permit assembly arises equally from the boundary surface reshaping deformation and recovery of the nylon material in the flange 33 and in the parts adjacent the opening 29. In this connection it is also pointed out that the degree of deflection illustrated by the dotted and solid lines in Fig. 3 is possibly proportionately slightly exaggerated for the purpose of more clearly illustrating the nature of the operation.

The assembly by snapping the parts together is thus permitted by the resilience of the parts either due to the material employed alone or in cooperation with certain configurations such as the slots 27. The resilience of either the gear 11 alone or the hub 13 (including flange 33) alone may be sufficient to permit passing of the parts into assembled relation even if the cooperating part were entirely rigid for practical purposes, but in any event at least the combined inherent resilience of the gear and hub are made sufficient to permit assembly in this fashion whatever the individual states of resilience or rigidity may be. This expression signifies that if either the hub or gear element is more rigid, then the resilience of the other will be sufficient to compensate, and that in pressing the parts into assembled relation individual deflection of one part or combined deflection of both parts, as the case may be, will allow them to pass.

Referring especially to Fig. 3 it can be seen that the outer element or gear 11, adjacent its central opening 29, is preferably provided with a peripheral chamfer or cam surface 37 which is faced towards the pinion 19 when the parts are about to be assembled. The surface 37 serves to start the assembly action by initiating the necessary boundary surface reshaping of the nylon parts, or the radial deflection of the sections of hub 13 in the form of Figs. 1 to 3, or both. The design of the parts is such that a moderately high force, by manual standards, is required for assembly, and later inadvertent disassembly is accordingly avoided.

While Figs. 2 and 3 show parts 13 and 11 both sectioned to indicate use of nylon in their construction, in some instances it is desirable to make one part or the other of some other material such as brass or steel. It is found that this can be effectively carried out, the nylon of the remaining part accommodating itself to the requirements of the more rigid element and supplying the properties necessary to achieve the objects herein aforesaid.

In actual practice it is found that if both parts 13 and 11 are of nylon, as shown in Figs. 2 and 3, the slots 27 are not required, for the deformation and recovery of which the parts are capable is ample to provide for their proper assembly and subsequent frictional connection. Where the part 11 is of metal or some other relatively rigid material and hub 13 of nylon, slotting of the hub 13 as at 27 is preferred to make assembly more practical without requiring reduction of the size of interlocking portions and unusually extreme accuracy of the dimensions of the parts. If the hub 13 were to be made of metal and the gear 11 of nylon, the slots 27 could be dispensed with since the deformation of which the gear is capable makes assembly fully practical with parts proportioned substantially as illustrated in the drawings.

Figure 4:
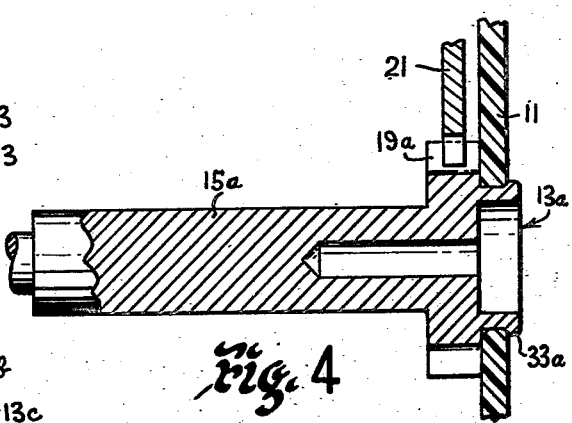
Fig. 4 is a view, partially in section and similar generally to the lower portion of Fig. 2 but illustrating an alternate form of the invention.

In Fig. 4 is illustrated a form of the invention which illustrates the principle set out in the immediately foregoing paragraph, a shaft 15a of metal being formed with an integral pinion 19a and hub 13a. The hub 13a and its flange 33a are preferably shaped similarly to hub 13 and flange 33 except that the slots 27 are omitted. A gear 11 of nylon identical with that previously described as snapped over the flange 33a and against gear 19a and provides a driving and slip-clutch action the equivalent of that described for the form shown in Figs. 1 to 3.

Figure 5:
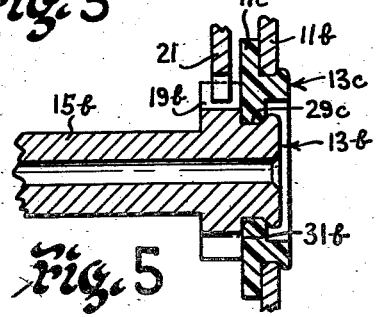
Fig. 5 is a view similar in nature to Fig. 4, but illustrating another alternate form of the invention.

Fig. 5 represents a form of the invention which may be used to get the full benefits flowing from the invention taught herein when it may otherwise be necessary or convenient to make both shaft and gear of metal. Here the shaft 15b mounts a gear 11b through the medium of a nylon insert 11c. The insert 11c is formed with a portion 29c resembling the interior of the gear 11 and designed to snap onto the hub 13b of the shaft 15b and against positioning surface 31b of the pinion 19b. The insert 11c also is formed to provide a hub portion 13c of larger diameter than, but of similar configuration to, hub 13b of shaft 15b and of suitable size and shape to receive the gear 11b by a snap assembly. In this arrangement a dual slipping action is provided, for the insert 11c may slip on hub 13b or gear 11b may slip on hub 13c of insert 11c, wherever the resistance happens to be least. In either case the advantages hereinbefore enumerated of having one of the clutch elements of nylon will obtain in full.

Having particularly described the invention, it will be clear that a simple new friction clutch arrangement for registers has been devised which will assure a life of extensive duration without significant variation in or impairment of the smooth setting or positive driving properties as a result of age and wear.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A setting clutch for registers comprising in combination a rotatable shaft including a cylindrical hub element, and an outer rotary element having a circular aperture adapted to receive said hub element in frictional clutching engagement therewith, at least one of said elements in the portions in contact with the other being of a resilient, tough, form-retentive, wear-resistant synthetic resinous composition with scuff resistant properties, said hub element being provided with an annular shoulder adapted for engagement axially of said shaft by said outer element and a circumferential retaining flange spaced from said shoulder, the combined resilience of said elements being sufficient to permit snapping of the outer element over said flange during assembly to retain said outer element in position adjacent said annular shoulder, while providing a frictional driving connection between said elements.

2. The combination as set forth in claim 1, wherein said hub element is hollow in order to facilitate deflection thereof when said elements are assembled.

3. In a register having a rotary indicator shaft including a hub element and an outer rotary element frictionally associated therewith so as to form a friction clutch means to permit setting of the register, the improvement which comprises a small retaining flange included as part of said hub element adjacent the outer element for preventing accidental separation of the elements, at least the combined inherent resilience of said elements being sufficient to permit snapping of the outer element over said flange during assembly and still provide a frictional driving connection between said elements when in place.

4. In a register having a rotary indicator shaft including a hub element and an outer rotary element frictionally associated therewith so as to form a friction clutch means to permit setting of the register, the improvement which comprises a small retaining flange included as part of said hub element adjacent the outer element for preventing accidental separation of the elements, at least one of said elements in the portions in contact with the other being of nylon and at least the combined inherent resilience of said elements being sufficient to permit snapping of the outer element over said flange during assembly and still provide a frictional driving connection between said elements when in place.

5. In a register, a rotary indicator shaft including a hub element; an outer rotary element frictionally associated therewith so as to form a friction clutch means to permit setting of the register; at least one of said elements in the portions in contact with the other being of a resilient, tough, form-retentive, wear-resistant synthetic resinous composition with scuff resistant properties; means providing a positioning and friction surface at said hub element rotatable therewith and spaced from the end thereof for frictional engagement by and positioning of said outer element axially of said shaft; a small retaining flange included as part of said hub element adjacent the end thereof and spaced from said positioning surface substantially equal to the thickness of said outer element for preventing accidental separation of the elements, at least the combined inherent resilience of said elements being sufficient to permit snapping of the outer element over said flange and into contact with said positioning surface during assembly.

6. In a register, a rotary indicator shaft including a hub element; an outer rotary element frictionally associated therewith so as to form a friction clutch means to permit setting of the register; at least one of said elements in the portions in contact with the other being of a resilient, tough, form-retentive, wear-resistant synthetic resinous composition with scuff resistant properties; means providing a positioning and friction surface at said hub element rotatable therewith and spaced from the end thereof for frictional engagement by and positioning of said outer element axially of said shaft; a small retaining flange included as part of said hub element adjacent the outer element for preventing accidental separation of the elements, the inner surface of said flange being tapered towards said positioning surface so as to form a cam means, said cam means being spaced from said positioning surface a distance such that the outer rotary member, when in face contact with said positioning surface, will also strike against a portion of said cam means and be cammed thereby in response to peripheral resilient pressure thereagainst into firm contact with said positioning surface, at least the combined inherent resilience of said elements being sufficient to permit snapping of the outer element over said flange during assembly and to provide the resilient camming pressure required.

7. In a register, a rotary indicator shaft including a hub element; an outer rotary element frictionally associated therewith so as to form a friction clutch means to permit setting of the register; at least one of said elements in the portions in contact with the other being of a resilient, tough, form-retentive, wear-resistant synthetic resinous composition with scuff resistant properties; means providing a positioning and friction surface at said hub element rotatable therewith and spaced from the end thereof for frictional engagement by and positioning of said outer element axially of said shaft; a small retaining flange included as part of said hub element adjacent the outer element for preventing accidental separation of the elements, the inner surface of said flange being tapered towards said positioning surface so as to form a cam means, said cam means being spaced from said positioning surface a distance such that the outer rotary member, when in face contact with said positioning surface, will also strike against a portion of said cam means and be cammed thereby in response to peripheral resilient pressure thereagainst into firm contact with said positioning surface, at least the combined inherent resilience of said elements being sufficient to permit snapping of the outer element over said flange during assembly and to provide the resilient camming pressure required; and means including a camming surface on said outer rotary element for initiating the deformation of the elements necessary to passing said outer rotary element over said retaining flange during assembly.

8. In a register, a rotary indicator shaft including an axially slotted hub element; an outer rotary element frictionally associated therewith so as to form a friction clutch means to permit setting of the register; at least one of said elements in the portions in contact with the other being of a resilient, tough, form-retentive, wear-resistant synthetic resinous composition with scuff resistant properties; means providing a positioning and friction surface at said hub element rotatable therewith and spaced from the end thereof for frictional engagement by and positioning of said outer element axially of said shaft; a small retaining flange included as part of said hub element adjacent the outer element for preventing accidental separation of the elements, the inner surface of said flange being tapered towards said positioning surface so as to form a cam means, said cam means being spaced from said positioning surface a distance such that the outer rotary member, when in face contact with said positioning surface, will also strike against a portion of said cam means and be cammed thereby in response to peripheral resilient pressure thereagainst into firm contact with said positioning surface, at least the combined inherent resilience of said elements being sufficient to permit snapping of the outer element over said flange during assembly and to provide the resilient camming pressure required, the slots in said hub element also permitting deflection of the hub portions between the slots to aid in passing the outer rotary element over the retaining flange.

References Cited in the file of this patent

UNITED STATES PATENTS 2,720,765    Drexler _____ Oct. 18, 1955

OTHER REFERENCES

Machine Design, March 1954 pp. 153–159, Designing Fabricated Nylon Parts, by R. B. Zimmerli.